(12) United States Patent
Miyazaki

(10) Patent No.: US 11,436,770 B2
(45) Date of Patent: *Sep. 6, 2022

(54) MOTION ANALYSIS DEVICE, MOTION ANALYSIS METHOD AND RECORDING MEDIUM

(71) Applicant: OMRON Corporation, Kyoto (JP)

(72) Inventor: Masashi Miyazaki, Nara (JP)

(73) Assignee: OMRON Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/070,900

(22) Filed: Oct. 14, 2020

(65) Prior Publication Data

US 2021/0142536 A1    May 13, 2021

(30) Foreign Application Priority Data

Nov. 12, 2019 (JP) .............................. JP2019-204465

(51) Int. Cl.
| | |
|---|---|
| *G06T 11/20* | (2006.01) |
| *G06T 7/20* | (2017.01) |
| *G06F 3/14* | (2006.01) |
| *G06V 40/20* | (2022.01) |

(Continued)

(52) U.S. Cl.
CPC .............. *G06T 11/206* (2013.01); *G06F 3/14* (2013.01); *G06T 7/20* (2013.01); *G06V 40/28* (2022.01); *G01L 1/00* (2013.01); *G01V 8/10* (2013.01); *G06T 2207/30196* (2013.01)

(58) Field of Classification Search
CPC G06T 11/206; G06T 7/20; G06F 3/14; G06K 9/00355; G06K 9/00375
See application file for complete search history.

(56) References Cited

U.S. PATENT DOCUMENTS

| | | | |
|---|---|---|---|
| 2004/0030436 A1* | 2/2004 | Popp ..................... | G06T 7/0004 700/109 |
| 2005/0010864 A1* | 1/2005 | Horikiri ................ | G06Q 10/10 715/229 |

(Continued)

FOREIGN PATENT DOCUMENTS

JP    2016087420    5/2016

OTHER PUBLICATIONS

Aoki Kyota; JP2016087420A English translation, May 23, 2016.*

*Primary Examiner* — Yi Yang
(74) *Attorney, Agent, or Firm* — JCIPRNET

(57) ABSTRACT

A motion analysis device, a motion analysis method and a computer-readable recording medium in which browsability is not likely to decrease even when motion data becomes longer are provided. A motion analysis device includes an acquisition part that acquires time-series data relating to an operation performed by an operator, an analysis part that analyzes the time-series data and generates motion data indicating a type of an elemental motion and an execution time of the elemental motion from a start to an end thereof, and a display control part that performs control to display objects indicating types and execution times of a plurality of elemental motions on a display part side by side in a time-series order of the time-series data, wherein the objects have a constant width in a direction in which the objects are lined up in a time-series order and indicate the execution times according to heights.

8 Claims, 8 Drawing Sheets

(51) Int. Cl.
  *G01L 1/00*     (2006.01)
  *G01V 8/10*     (2006.01)

(56) References Cited

U.S. PATENT DOCUMENTS

| | | | | |
|---|---|---|---|---|
| 2009/0295942 A1* | 12/2009 | Barnett | ............... | H04N 1/32112 |
| | | | | 348/231.2 |
| 2012/0053850 A1* | 3/2012 | Yasukawa | ........... | H04N 1/00068 |
| | | | | 702/34 |
| 2016/0041803 A1* | 2/2016 | Markov | ................... | G06F 3/147 |
| | | | | 701/48 |
| 2017/0010187 A1* | 1/2017 | Morita | .............. | G05B 19/41875 |

\* cited by examiner

ND RECORDING
MOTION ANALYSIS DEVICE, MOTION ANALYSIS METHOD AND RECORDING MEDIUM

CROSS REFERENCE TO RELATED APPLICATIONS

This application claims the priority benefit of Japanese Patent Application No. 2019-204465, filed on Nov. 12, 2019. The entirety of the above-mentioned patent application is hereby incorporated by reference herein and made a part of this specification.

BACKGROUND

Technical Field

The disclosure relates to a motion analysis device, a motion analysis method and a motion analysis program.

Description of Related Art

In the past, motion sensors that measure motion data of operators and techniques of analyzing moving images obtained by photographing situations in which operators move and generating motion data have been used. The motion data may be used for evaluating whether operators are performing proper motions.

For example, the following Patent Document 1 (Japanese Patent Application Laid-Open No. 2016-87420) discloses a coordinated movement evaluation device that displays repetitive movement for any part of a human body, detects movement performed by a subject in imitation of the repetitive movement, compares evaluation target data based on the movement performed by the subject with reference data used for evaluating the movement performed by the subject, and evaluates the movement performed by the subject.

In Patent Document 1, for example, as shown in FIG. 6, a graph of evaluation target data based on movement performed by a subject is displayed by representing time on the horizontal axis and representing the amount of detection on the vertical axis. However, when such display is performed, a graph increases in width as motion data becomes longer, which results in a decrease in browsability.

The disclosure provides a motion analysis device, a motion analysis method and a non-transitory computer-readable recording medium storing a motion analysis program in which browsability is not likely to decrease even when motion data becomes longer.

SUMMARY

According to one embodiment of the present disclosure, there is provided a motion analysis device including: an acquisition part that acquires time-series data relating to an operation performed by an operator; an analysis part that analyzes the time-series data and generates motion data indicating a type of an elemental motion and an execution time of the elemental motion from a start to an end thereof; and a display control part that performs control to display objects indicating types and execution times of a plurality of elemental motions on a display part side by side in a time-series order of the time-series data, wherein the objects have a constant width in a direction in which the objects are lined up in a time-series order and indicate the execution times according to heights.

According to another embodiment of the present disclosure, there is provided a motion analysis method including: acquiring time-series data relating to an operation performed by an operator; analyzing the time-series data and generating motion data indicating a type and an execution time of an elemental motion; and performing control to display objects indicating types and execution times of a plurality of elemental motions on a display part side by side in a time-series order of the time-series data, wherein the objects have a constant width in a direction in which the objects are lined up in a time-series order and indicate the execution times according to heights.

According to another embodiments of the present disclosure, there is provided a motion analysis program causing a calculation part included in a motion analysis device to function as: an acquisition part that acquires time-series data relating to an operation performed by an operator; an analysis part that analyzes the time-series data and generates motion data indicating a type and an execution time of an elemental motion; and a display control part that performs control to display objects indicating types and execution times of a plurality of elemental motions on a display part side by side in a time-series order of the time-series data, wherein the objects have a constant width in a direction in which the objects are lined up in a time-series order and indicate the execution times according to heights.

DESCRIPTION OF THE EMBODIMENTS

Figure 1:
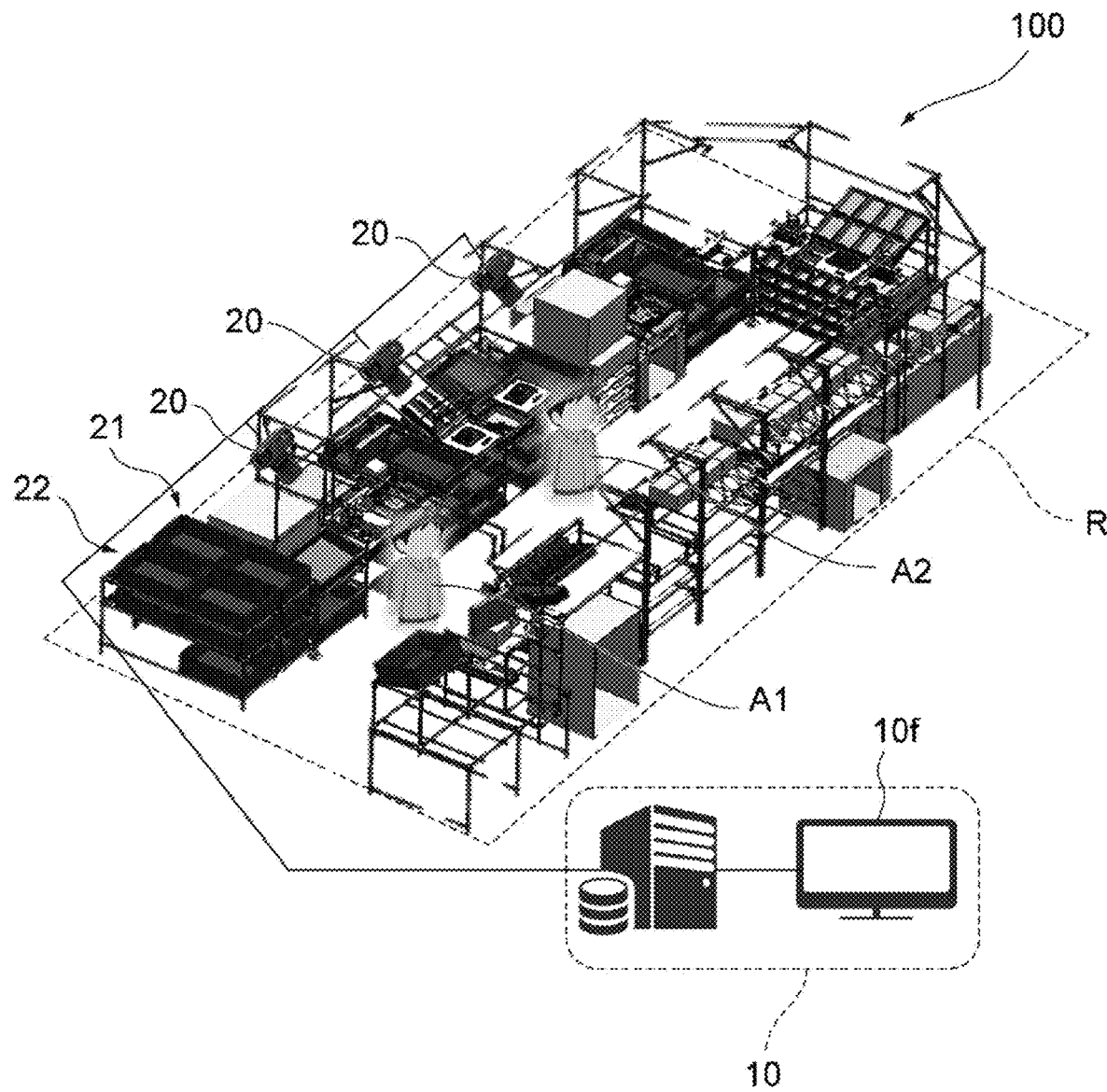
FIG. 1 is a diagram illustrating an outline of a motion analysis system according to an embodiment of the disclosure.

An embodiment of the disclosure will be described with reference to the accompanying drawings. Meanwhile, in each drawing, objects denoted by the same reference numerals and signs have the same or similar configurations.

1. Application Example

First, an example of a situation to which the disclosure is applied will be described with reference to FIG. 1. FIG. 1 is a diagram illustrating an outline of a motion analysis system 100 according to an embodiment of the disclosure. The motion analysis system 100 according to the present embodiment includes a camera 20 that captures a moving image relating to an operator's motion which is executed in a work area R, a photoelectric sensor 21 that detects that the operator's hand enters and leaves a predetermined region, and a pressure sensor 22 that measures pressure applied to a predetermined region. Here, a moving image captured by the camera 20, a signal measured by the photoelectric sensor 21, and a signal measured by the pressure sensor 22 are examples of time-series data of the disclosure. The work area R of this example is a region including the whole manufacturing line, but the work area R may be any region, and may be, for example, a region in which a predetermined process is performed or a region in which a predetermined elemental motion is performed. The elemental motion referred to here is a motion of one unit which is executed by an operator, and includes a motion such as, for example, grasping of parts, transportation of parts, assembly and adjustment of parts, or storage of an assembled product.

In this example, a case where a first operator A1 and a second operator A2 perform operations determined in advance in the work area R will be described. Hereinafter, the first operator A1 and the second operator A2 are referred to as an operator A collectively.

The motion analysis system 100 includes a motion analysis device 10. The motion analysis device 10 acquires time-series data relating to motions of a plurality of parts of the operator A such as a moving image, analyzes the time-series data, and generates motion data indicating the type of elemental motion and the execution time of the elemental motion from the start to the end thereof. In addition, the motion analysis device 10 performs control to display objects indicating the types and execution times of a plurality of elemental motions on the display part 10$f$ side by side in a time-series order of the time-series data. Here, the objects have a constant width in a direction in which they are lined up in a time-series order, and indicate execution times according to height.

The display part 10$f$ displays objects indicating the types and execution times of a plurality of elemental motions side by side in a time-series order of the time-series data. In addition, the display part 10$f$ may display objects indicating the types and execution times of a plurality of elemental motions serving as a reference side by side in a time-series order. Further, the display part 10$f$ may reproduce a moving image relating to a motion of the operator A for each of a plurality of elemental motions.

According to the motion analysis device 10 of the present embodiment, by displaying objects that have a constant width in a direction in which they are lined up in a time-series order and indicate execution times according to height, the objects fall within a relatively narrow region even though motion data becomes longer, and thus browsability is not likely to decrease.

2. Configuration Example

[Functional Configuration]

Figure 2:
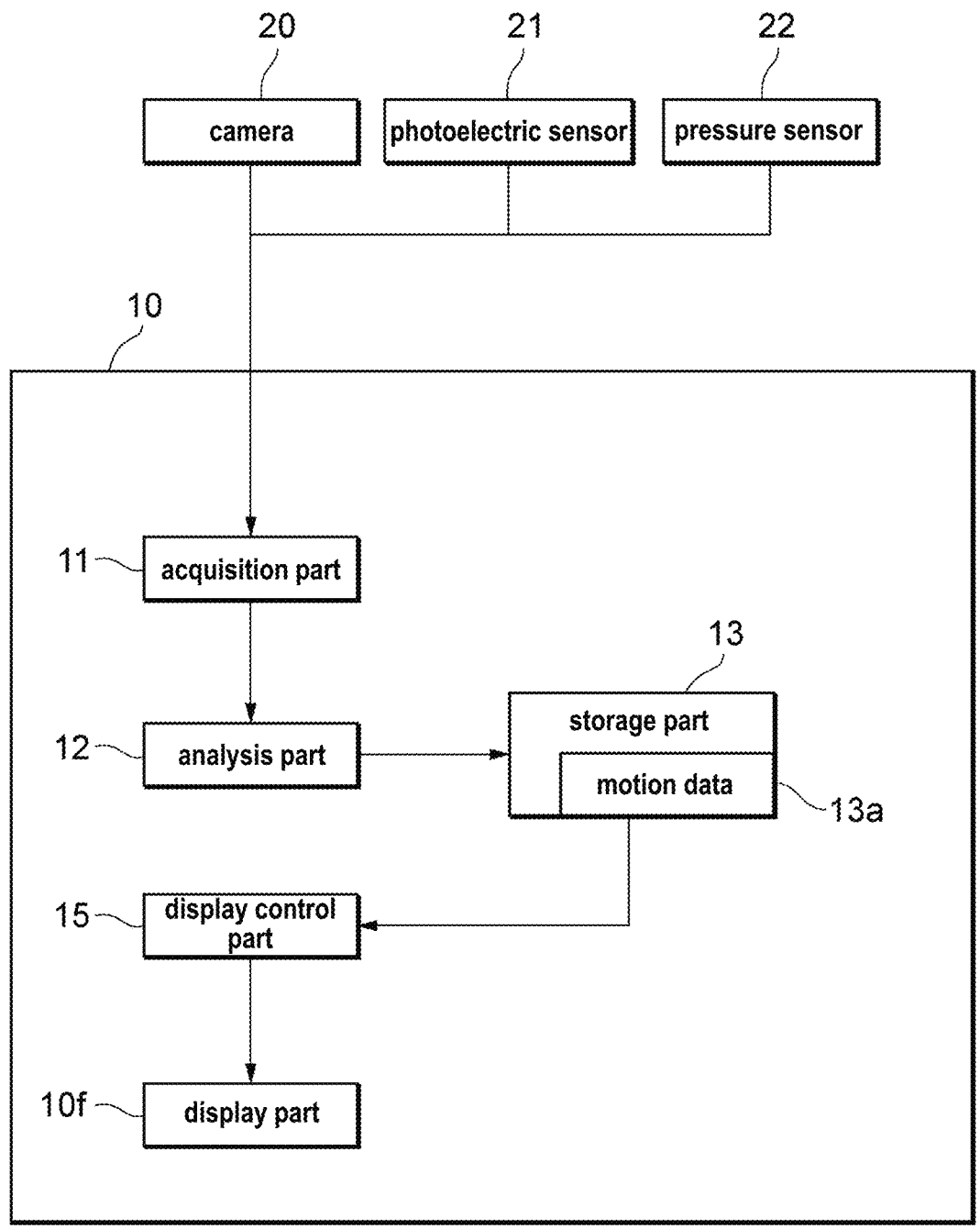
FIG. 2 is a diagram illustrating a functional block of the motion analysis device according to the present embodiment.

FIG. 2 is a diagram illustrating of a functional block of the motion analysis device 10 according to the present embodiment. The motion analysis device 10 includes an acquisition part 11, an analysis part 12, a storage part 13, and a display control part 15.

<Acquisition Part>

The acquisition part 11 acquires time-series data relating to motions of a plurality of parts of the operator A with respect to an operation performed by the operator A. The time-series data includes a moving image captured by the camera 20, a signal measured by the photoelectric sensor 21, and a signal measured by the pressure sensor 22.

<Analysis Part>

The analysis part 12 analyzes the time-series data and generates motion data indicating the type of elemental motion and the execution time of the elemental motion from the start to the end thereof. The type of elemental motion is, for example, grasping, transportation, adjustment and storage of parts, but may include other types of motions. In addition, the elemental motion may be arbitrarily set. The start and end of the elemental motion may be represented by a time, or may be represented by an elapsed time from a starting point in time of time-series data.

<Storage Part>

The storage part 13 stores motion data 13$a$ generated by the analysis part 12. The storage part 13 may store time-series data.

<Display Control Part>

The display control part 15 performs control to display objects indicating the types and execution times of a plurality of elemental motions on the display part 10$f$ side by side in a time-series order of the time-series data. The objects have a constant width in a direction in which they are lined up in a time-series order, and indicate execution times according to height. The height referred to here is a height in a direction approximately orthogonal to the direction in which they are lined up in a time-series order. More generally, the objects may have a constant width in a direction in which they are lined up in a time-series order, and indicate execution times according to widths in directions different from the direction.

The display control part 15 may perform control to display the objects indicating the types and execution times of a plurality of elemental motions and objects indicating the types and execution times of a plurality of elemental motions serving as a reference on the display part 10$f$ side by side in a time-series order. Here, the plurality of elemental motions serving as a reference is an elemental motion serving as a sample in a case where the operator A performs an operation. The display control part 15 shows a sample of the order of execution of a plurality of elemental motions and the execution times thereof. In this manner, comparison with a motion serving as a sample is facilitated by displaying the objects indicating the types and execution times of a plurality of elemental motions serving as a reference together.

The display control part 15 may perform control to display objects indicating a time when the operator A performs none of a plurality of elemental motions on the display part 10$f$ in distinction from the objects indicating the types and execution times of a plurality of elemental motions. The display control part 15 may, for example, display the objects indicating the types and execution times of a plurality of elemental motions with rectangles represented by solid lines, and display the objects indicating a time when none of a plurality of elemental motions is performed with rectangles represented by broken lines. In this manner, occurrence of a wasted time can be easily ascertained by displaying the objects indicating a time when an operator performs none of a plurality of elemental motions.

In a case where the execution time exceeds a predetermined time, the display control part 15 may perform control to fold and display objects on the display part 10$f$ in a direction indicating the execution time. The display control part 15 displays the execution time of a certain elemental motion according to a rectangle of height which is proportional to the execution time in principle, but in a case where the execution time exceeds a predetermined time, a rectangle extending from a predetermined height toward a height of zero may be displayed in a display mode different from a display mode from a height of zero to a predetermined height. In this manner, by folding and displaying objects, the objects also fall within a relatively narrow region in the direction of height, and thus browsability is not likely to decrease.

[Hardware Configuration]

Figure 3:
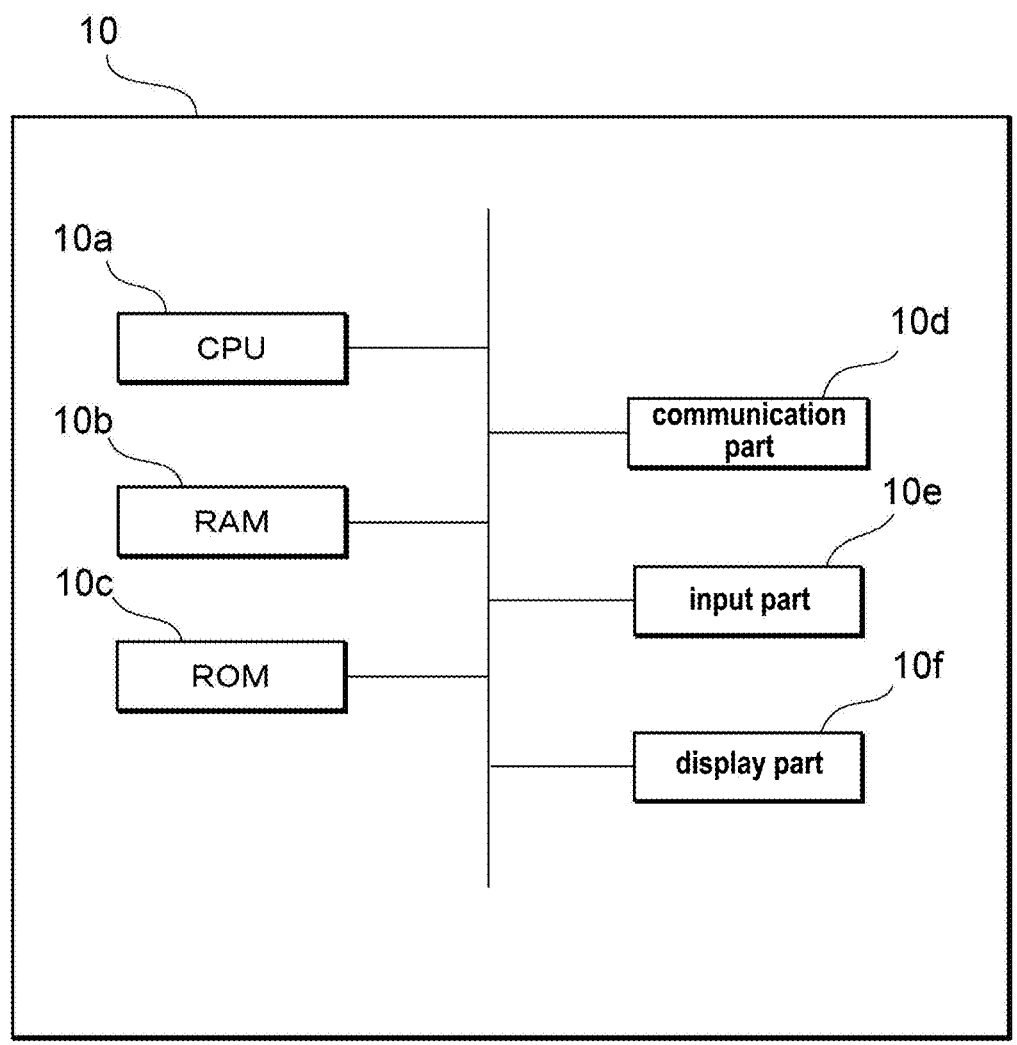
FIG. 3 is a diagram illustrating a physical configuration of the motion analysis device according to the present embodiment.

FIG. 3 is a diagram illustrating a physical configuration of the motion analysis device 10 according to the present embodiment. The motion analysis device 10 includes a central processing unit (CPU) 10a equivalent to a calculation part, a random access memory (RAM) 10b equivalent to the storage part, a read only memory (ROM) 10c equivalent to the storage part, a communication part 10d, an input part 10e, and the display part 10f. These components are connected to each other so as to mutually transmit and receive data through a bus. Meanwhile, in this example, a case where the motion analysis device 10 is constituted by one computer will be described, but the motion analysis device 10 may be realized by a combination of a plurality of computers. In addition, the components shown in FIG. 3 are an example, and the motion analysis device 10 may have components other than these, or may not have some of these components.

The CPU 10a is a control part that performs control relating to the execution of a program stored in the RAM 10b or the ROM 10c or the calculation or processing of data. The CPU 10a is a calculation part that generates motion data by analyzing time-series data relating to an operation performed by the operator and executes a program (motion analysis program) for displaying objects indicating the types and execution times of elemental motions on the display part 10f side by side in a time-series order of the time-series data. The CPU 10a receives various types of data from the input part 10e or the communication part 10d, and displays results of calculation of data on the display part 10f or stores the results in the RAM 10b.

The RAM 10b is an element that can rewrite data among the storage parts, and may be constituted by, for example, a semiconductor memory element. The RAM 10b may store a program executed by the CPU 10a or data such as motion data. Meanwhile, these are an example, and the RAM 10b may store data other than these, or may not store some of these.

The ROM 10c is an element that can read out data among the storage parts, and may be constituted by, for example, a semiconductor memory element. The ROM 10c may store, for example, a motion analysis program or data which is not rewritten.

The communication part 10d is an interface for connecting the motion analysis device 10 to other instruments. The communication part 10d may be connected to a communication network such as the Internet.

The input part 10e accepts an input of data from a user, and may include, for example, a keyboard and a touch panel.

The display part 10f visually displays the result of calculation performed by the CPU 10a, and may be constituted by, for example, a liquid crystal display (LCD). The display part 10f may display objects indicating the types and execution times of elemental motions side by side in a time-series order of the time-series data.

The motion analysis program may be provided by being stored in a computer readable storage medium such as the RAM 10b or the ROM 10c, or may be provided through a communication network which is connected by the communication part 10d. In the motion analysis device 10, various motions described with reference to FIG. 2 are realized by the CPU 10a executing the motion analysis program. Meanwhile, these physical configurations are an example, and may not necessarily be independent of each other. For example, the motion analysis device 10 may include a large-scale integration (LSI) in which the CPU 10a and the RAM 10b or the ROM 10c are integrated with each other.

3. Operation Example

Figure 4:
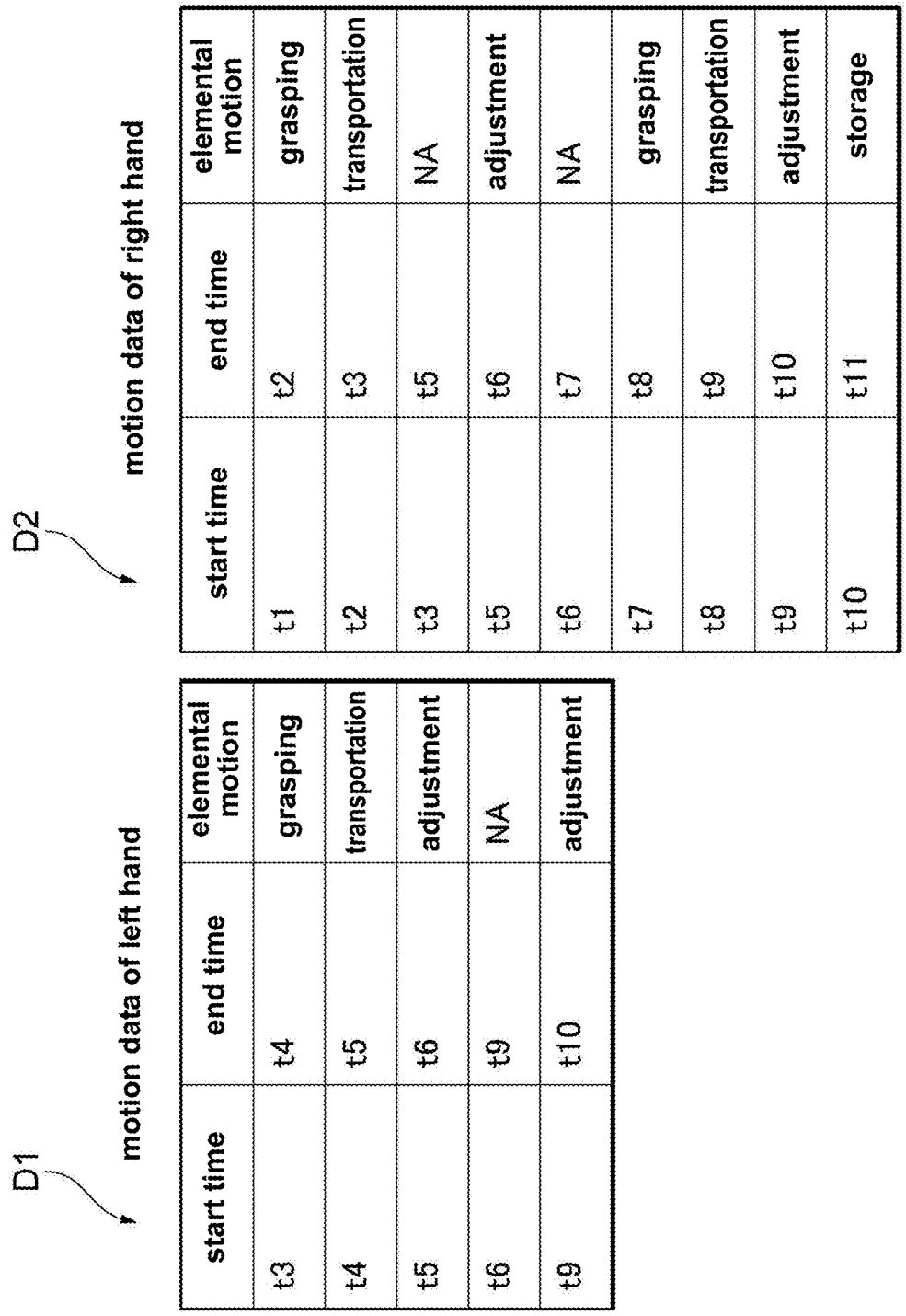
FIG. 4 is a diagram illustrating motion data generated by the motion analysis device according to the present embodiment.

FIG. 4 is a diagram illustrating motion data generated by the motion analysis device 10 according to the present embodiment. The drawing shows each example of motion data D1 of a left hand and motion data D2 of a right hand. Letters of t1 to t11 described in the drawing indicate times arranged in a time-series order.

The motion data D1 of the left hand and the motion data D2 of the right hand include a column of "elemental motions" indicating the types of elemental motions, a column of "start times" indicating the start times of elemental motions, and a column of "end times" indicating the end times of elemental motions.

For example, in the motion data D1 of the left hand, an "elemental motion" having a start time of "t3" and an end time of "t4" is "grasping." In addition, in the motion data D1 of the left hand, an "elemental motion" having a start time of "t4" and an end time of "t5" is "transportation." In addition, in the motion data D2 of the right hand, an "elemental motion" having a start time of "t1" and an end time of "t2" is "grasping." Further, in the motion data D2 of the right hand, an "elemental motion" having a start time of "t2" and an end time of "t3" is "transportation." In this case, it is indicated that a motion of grasping is performed with the right hand from time t1 to time t2, a motion of transportation is subsequently performed with the right hand, a motion of grasping is then performed with the left hand, and a motion of transportation is performed with the left hand.

In addition, in the motion data D2 of the right hand, it is indicated that an "elemental motion" having a start time of "t3" and an end time of "t5" is "NA" and that a motion relating to an operation is not performed. Meanwhile, an "elemental motion" of "NA" involves the operator A having stopped or a motion irrelevant to a predetermined elemental motion being performed.

Figure 5:
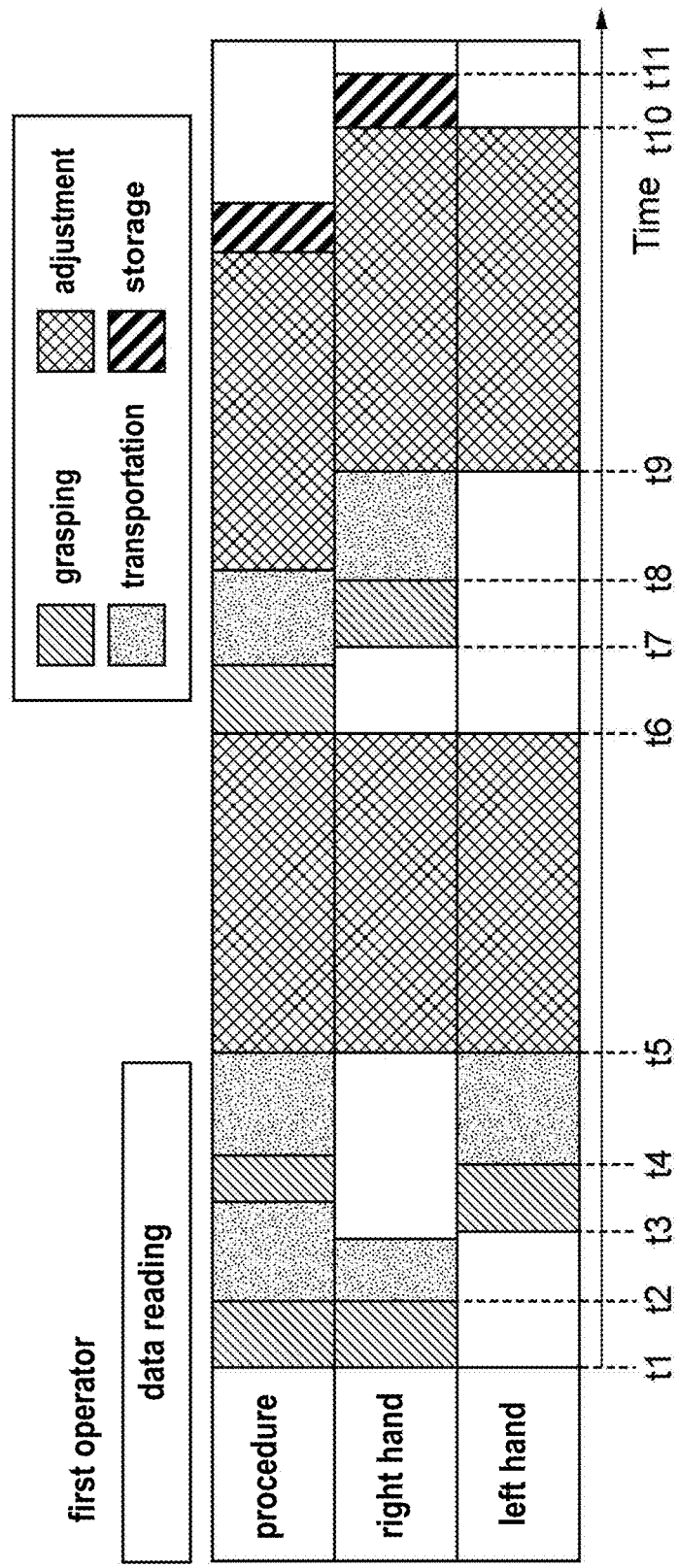
FIG. 5 is a diagram illustrating a display example of motion data of the related art.

FIG. 5 is a diagram illustrating a display example of motion data of the related art. This example is an example in which the motion data D1 of the left hand and the motion data D2 of the right hand shown in FIG. 4 are displayed in left alignment in a time-series order. In addition, in the drawing, reference motion data indicated as a "procedure" is displayed together.

In this example, the elemental motions performed with the left hand and the right hand from time t1 to time t11 are displayed by rectangles having widths proportional to the execution times, which results in applying compression to a display region. In the case of such a display method, when the size of the display region is fixed, a rectangle indicating an elemental motion is displayed smaller as the motion data becomes longer, which results in a decrease in browsability. In addition, when the display region is made slidable, a sliding range becomes longer as the motion data becomes longer, and the whole image of the motion data is not likely to be ascertained, which results in a decrease in browsability.

Figure 6:
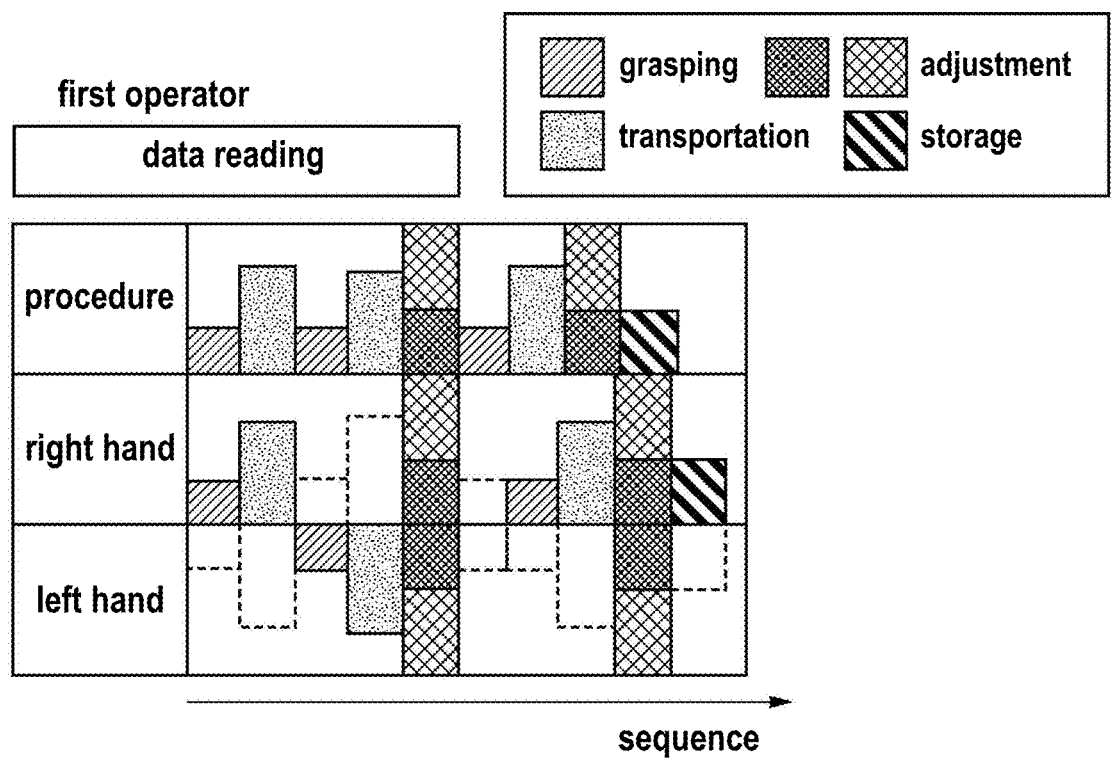
FIG. 6 is a diagram illustrating a display example of motion data controlled to be displayed by the motion analysis device according to the present embodiment.

FIG. 6 is a diagram illustrating a display example of motion data controlled to be displayed by the motion analysis device 10 according to the present embodiment. This example is an example in which, in the motion data D1 of the left hand and the motion data D2 of the right hand shown in FIG. 4, the objects indicating the types and execution times of a plurality of elemental motions are displayed side by side in a time-series order of the time-series data. In addition, in the drawing, reference motion data indicated as a "procedure" is displayed together. In this display example, objects are bar graphs having different hatching depending on the type of elemental motion and having a height proportional to the execution time of the elemental motion.

The motion analysis device 10 causes the display part 10*f* to display bar graphs having a constant width in a direction in which they are lined up in a time-series order and indicating execution times according to height side by side in a time-series order. Meanwhile, the horizontal axis in the drawing is a sequence indicating the order of execution of elemental motions, and is equivalent to a direction in which they are lined up in a time-series order. In this example, the height direction of a bar graph indicating the execution time of an elemental motion of the right hand and the height direction of a bar graph indicating the execution time of an elemental motion of the left hand are opposite to each other.

In this manner, by displaying objects that have a constant width in a direction in which they are lined up in a time-series order and indicate execution times according to height, the objects fall within a relatively narrow region even though motion data becomes longer, and thus browsability is not likely to decrease.

In this example, the motion analysis device 10 displays bar graphs indicating the types and execution times of a plurality of elemental motions with rectangles represented by solid lines, and displays bar graphs indicating a time when none of a plurality of elemental motions is performed with rectangles represented by broken lines. This makes it possible to ascertain at first sight that there is a period in which neither the right hand nor the left hand performs an elemental motion.

In addition, in a case where the execution time exceeds a predetermined time, the motion analysis device 10 folds and displays bar graphs in a direction indicating the execution time. Specifically, regarding elemental motions of two "adjustments" which are performed with the right hand and the left hand, bar graphs are folded and displayed in a direction indicating the execution time. In this manner, by folding and displaying objects, the objects also fall within a relatively narrow region in the direction of height, and thus browsability is not likely to decrease.

Figure 7:
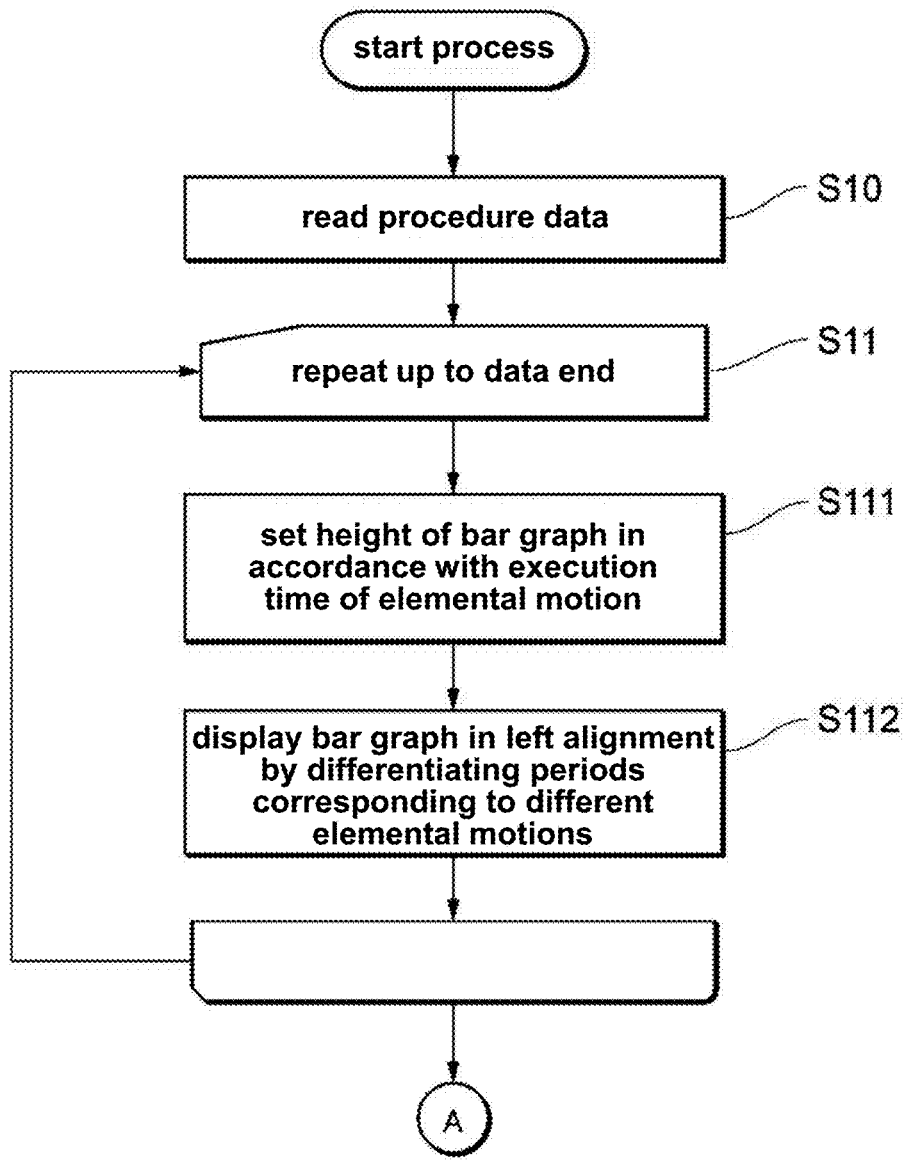
FIG. 7 is a flow chart of a first example of a display control process which is executed by the motion analysis device according to the present embodiment.

FIG. 7 is a flow chart of a first example of a display control process which is executed by the motion analysis device 10 according to the present embodiment. The first example of the display control process is an example of a process of performing control to display procedure data on the display part 10*f*. Meanwhile, the procedure data is reference motion data of the disclosure, and is motion data serving as a sample of an operation of the operator A.

First, the motion analysis device 10 reads procedure data from the storage part 13 (S10). The procedure data referred to here is motion data indicating an ideal procedure relating to an operation of the operator A. The procedure data may be read from the storage part 13, or may be read from an external storage device.

Next, the motion analysis device 10 repeatedly executes the following processes S111 and S112 up to the end of the procedure data (S11). The motion analysis device 10 sets the height of a bar graph in accordance with the execution time of an elemental motion (S111), and displays bar graphs in left alignment by differentiating periods corresponding to different elemental motions (S112).

By executing the first example of the display control process, the procedure data is displayed on the display part 10*f* with bar graphs having a height according to the execution time in a time-series order.

Figure 8:
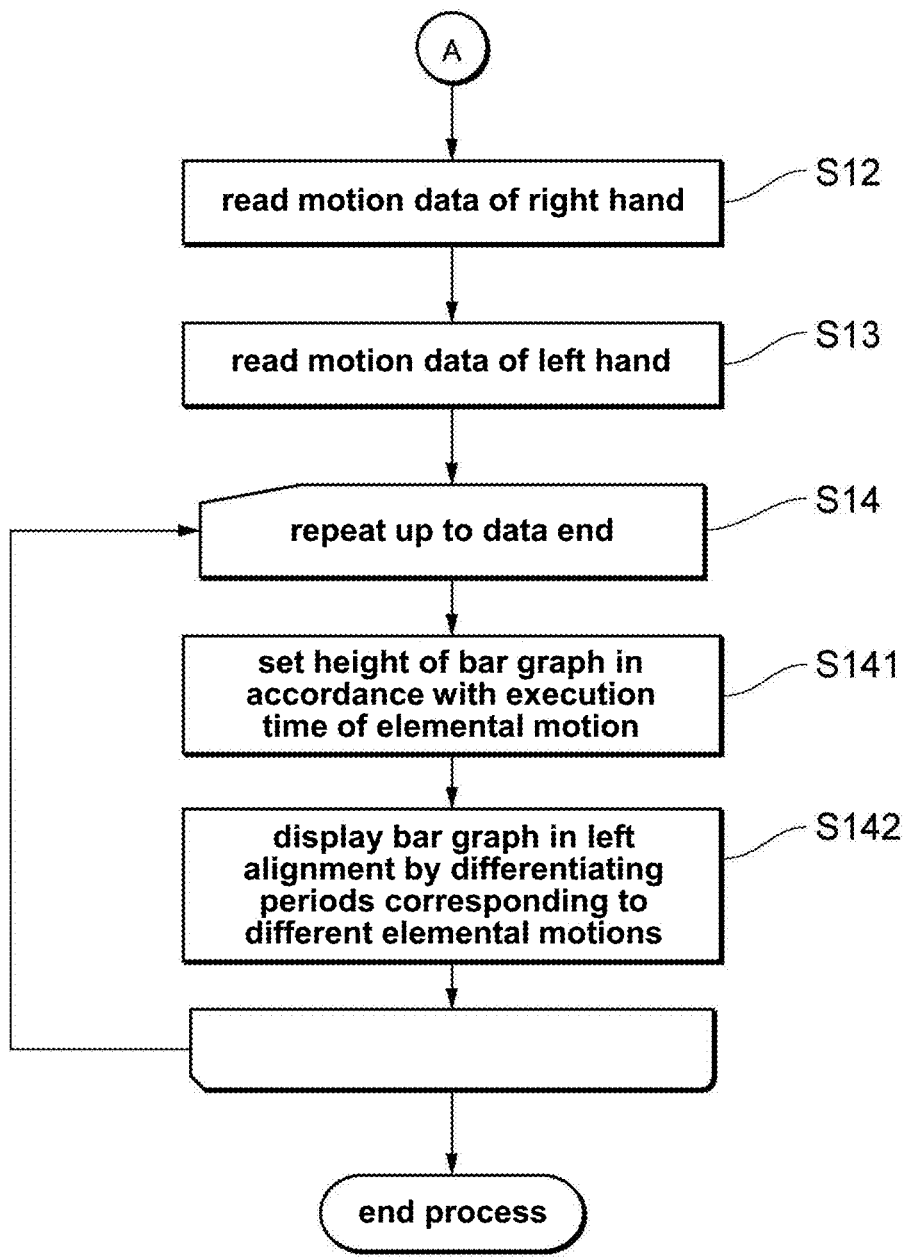
FIG. 8 is a flow chart of a second example of the display control process which is executed by the motion analysis device according to the present embodiment.

FIG. 8 is a flow chart of a second example of the display control process which is executed by the motion analysis device 10 according to the present embodiment. The second example of the display control process is an example of a process which is executed after the first example of the display control process and a process of performing control to display motion data of the right hand and the left hand.

The motion analysis device 10 reads the motion data of the right hand (S12), and reads the motion data of the left hand (S13). Meanwhile, either reading of the motion data of the right hand or reading of the motion data of the left hand may be performed first.

The motion analysis device 10 repeatedly executes the following processes S141 to S142 up to the end of the motion data (S14). The motion analysis device 10 sets the height of a bar graph in accordance with the execution time of an elemental motion (S141). The motion analysis device 10 displays bar graphs in left alignment by differentiating periods corresponding to different elemental motions (S142).

Meanwhile, the motion analysis device 10 may display data corresponding to a period (period of NA) in which an elemental motion included in the motion data of the left hand is not performed and data corresponding to a period (period of NA) in which an elemental motion included in the motion data of the right hand is not performed, in distinction from data corresponding to a period in which a plurality of elemental motions is performed.

By executing the second example of the display control process, the motions of the right hand and the left hand are displayed on the display part 10*f* so that objects fall within a relatively narrow region even though the motion data becomes longer, and thus it is possible to use a display region efficiently.

Embodiments of the disclosure may also be described as in the following additions. However, the embodiments of the disclosure are not limited to forms described in the following additions. In addition, the embodiments of the disclosure may be forms obtained by replacing or combining the descriptions between the additions.

[Addition 1]

A motion analysis device (10) comprising:

an acquisition part (11) that acquires time-series data relating to an operation performed by an operator;

an analysis part (12) that analyzes the time-series data and generates motion data indicating a type of elemental motion and an execution time of the elemental motion from a start to an end thereof; and a display control part (15) that performs control to display objects indicating types and execution times of the plurality of elemental motions on a display part side by side in a time-series order of the time-series data, wherein the objects have a constant width in a direction in which they are lined up in a time-series order and indicate the execution times according to height.

[Addition 2]

The motion analysis device (10) according to claim 1, wherein the display control part (15) performs control to display the objects indicating the types and execution times of the plurality of elemental motions and objects indicating types and execution times of a plurality of elemental motions serving as a reference on the display part side by side in a time-series order.

[Addition 3]

The motion analysis device (10) according to claim 1 or 2, wherein the display control part (15) performs control to display objects indicating a time when the operator performs none of the plurality of elemental motions on the display part, in distinction from the objects indicating the types and execution times of the plurality of elemental motions.

[Addition 4]

The motion analysis device (10) according to any one of claims 1 to 3, wherein, in a case where the execution time exceeds a predetermined time, the display control part (15) performs control to fold and display the objects on the display part in a direction indicating the execution time.

[Addition 5]

A motion analysis method comprising:

acquiring time-series data relating to an operation performed by an operator;

analyzing the time-series data and generating motion data indicating a type and execution time of an elemental motion; and performing control to display objects indicating types and execution times of the plurality of elemental motions on a display part side by side in a time-series order of the time-series data, wherein the objects have a constant width in a direction in which they are lined up in a time-series order and indicate the execution times according to height.

[Addition 6]

A motion analysis program causing a calculation part included in a motion analysis device (10) to function as:

an acquisition part (11) that acquires time-series data relating to an operation performed by an operator;

an analysis part (12) that analyzes the time-series data and generates motion data indicating a type and execution time of an elemental motion; and a display control part (15) that performs control to display objects indicating types and execution times of the plurality of elemental motions on a display part side by side in a time-series order of the time-series data, wherein the objects have a constant width in a direction in which they are lined up in a time-series order and indicate the execution times according to height.

Other Configurations

According to one embodiment of the present disclosure, there is provided a motion analysis device including: an acquisition part that acquires time-series data relating to an operation performed by an operator; an analysis part that analyzes the time-series data and generates motion data indicating a type of an elemental motion and an execution time of the elemental motion from a start to an end thereof; and a display control part that performs control to display objects indicating types and execution times of a plurality of elemental motions on a display part side by side in a time-series order of the time-series data, wherein the objects have a constant width in a direction in which the objects are lined up in a time-series order and indicate the execution times according to heights.

According to this configuration, by displaying objects that have a constant width in a direction in which the objects are lined up in a time-series order and indicate execution times according to heights, the objects fall within a relatively narrow region even though motion data becomes longer, and thus browsability is not likely to decrease. The objects have a constant width in a direction in which the objects are lined up in a time-series order, and indicate execution times according to width in a direction different from that direction.

In one embodiment, the display control part may perform control to display the objects indicating the types and execution times of the plurality of elemental motions and objects indicating types and execution times of a plurality of elemental motions serving as a reference on the display part side by side in a time-series order.

According to this configuration, comparison with a motion serving as a sample is facilitated by displaying the objects indicating the types and execution times of a plurality of elemental motions serving as a reference together.

In one embodiment, the display control part may perform control to display objects indicating a time when the operator performs none of the plurality of elemental motions on the display part, in distinction from the objects indicating the types and execution times of the plurality of elemental motions.

According to this configuration, occurrence of wasted time can be easily ascertained by displaying the objects indicating a time when an operator performs none of a plurality of elemental motions.

In one embodiment, in a case where the execution time exceeds a predetermined time, the display control part may perform control to fold and display the objects on the display part in a direction indicating the execution time.

According to this configuration, by folding and displaying objects, the objects also fall within a relatively narrow region in the direction of height, and thus browsability is not likely to decrease.

According to another embodiment of the present disclosure, there is provided a motion analysis method including: acquiring time-series data relating to an operation performed by an operator; analyzing the time-series data and generating motion data indicating a type and an execution time of an elemental motion; and performing control to display objects indicating types and execution times of a plurality of elemental motions on a display part side by side in a time-series order of the time-series data, wherein the objects have a constant width in a direction in which the objects are lined up in a time-series order and indicate the execution times according to heights.

According to this configuration, by displaying objects that have a constant width in a direction in which the objects are lined up in a time-series order and indicate execution times according to heights, the objects fall within a relatively narrow region even though motion data becomes longer, and thus browsability is not likely to decrease.

According to another embodiments of the present disclosure, there is provided a motion analysis program causing a calculation part included in a motion analysis device to function as: an acquisition part that acquires time-series data relating to an operation performed by an operator; an analysis part that analyzes the time-series data and generates motion data indicating a type and an execution time of an elemental motion; and a display control part that performs control to display objects indicating types and execution times of a plurality of elemental motions on a display part side by side in a time-series order of the time-series data, wherein the objects have a constant width in a direction in which the objects are lined up in a time-series order and indicate the execution times according to heights.

According to this configuration, by displaying objects that have a constant width in a direction in which they are lined up in a time-series order and indicate execution times according to height, the objects fall within a relatively narrow region even though motion data becomes longer, and thus browsability is not likely to decrease.

According to the disclosure, it is possible to provide a motion analysis device, a motion analysis method and a motion analysis program in which browsability is not likely to decrease even when motion data becomes longer.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A motion analysis device for an operator that moves and performs operations in a work area of a manufacturing line, comprising:
    a processor, configured to acquire time-series data relating to the operations performed by the operator from a plurality of sensors that generates the time-series data, wherein the operator performs the operations to at least one manufacturing unit of the manufacturing line, and configured to analyze the time-series data and generates motion data indicating a type of an elemental motion and an execution time of the elemental motion from a start to an end thereof, wherein the elemental motion refers to a motion that is executed within the execution time by hands of the operator with respective to the at least one manufacturing unit which is executed by the operator; and
    a display control part that performs control to display objects indicating types and execution times of a plurality of elemental motions on a display part side by side in a time-series order of the time-series data,
    wherein the objects respectively have a same width in a direction in which the objects are lined up in a time-series order and indicate the execution times according to heights,
    the display control part performs control to display the objects indicating the types and the execution times of the plurality of elemental motions and objects indicating types and execution times of a plurality of elemental motions serving as a reference on the display part side by side in the time-series order.

2. The motion analysis device according to claim 1, wherein the display control part performs control to display objects indicating a time when the operator performs none of the plurality of elemental motions on the display part, in distinction from the objects indicating the types and the execution times of the plurality of elemental motions.

3. The motion analysis device according to claim 2, wherein, in a case where the execution time exceeds a predetermined time, the display control part performs control to fold and display the objects on the display part in a direction indicating the execution time.

4. The motion analysis device according to claim 1, wherein the display control part performs control to display objects indicating a time when the operator performs none of the plurality of elemental motions on the display part, in distinction from the objects indicating the types and the execution times of the plurality of elemental motions.

5. The motion analysis device according to claim 1, wherein, in a case where the execution time exceeds a predetermined time, the display control part performs control to fold and display the objects on the display part in a direction indicating the execution time.

6. The motion analysis device according to claim 1, wherein, in a case where the execution time exceeds a predetermined time, the display control part performs control to fold and display the objects on the display part in a direction indicating the execution time.

7. A motion analysis method for an operator that moves and performs operations in a work area of a manufacturing line, comprising:
    acquiring time-series data relating to the operations performed by the operator from a plurality of sensors that generates the time-series data, wherein the operator performs the operations to at least one manufacturing unit of the manufacturing line;
    analyzing the time-series data and generating motion data indicating a type and an execution time of an elemental motion, wherein the elemental motion refers to a motion that is executed within the execution time by hands of the operator with respective to the at least one manufacturing unit which is executed by the operator;
    performing control to display objects indicating types and execution times of a plurality of elemental motions on a display part side by side in a time-series order of the time-series data; and
    performing control to display the objects indicating the types and the execution times of the plurality of elemental motions and objects indicating types and execution times of a plurality of elemental motions serving as a reference on the display part side by side in the time-series order,
    wherein the objects respectively have a same width in a direction in which the objects are lined up in the time-series order and indicate the execution times according to heights.

8. A non-transitory computer-readable recording medium that stores a motion analysis program causing a calculation part included in a motion analysis device for an operator that moves and performs operations in a work area of a manufacturing line to function as:
    an acquisition part that acquires time-series data relating to the operations performed by the operator from a plurality of sensors that generates the time-series data, wherein the operator performs the operations to at least one manufacturing unit of the manufacturing line;
    an analysis part that analyzes the time-series data and generates motion data indicating a type and an execution time of an elemental motion, wherein the elemental motion refers to a motion that is executed within the execution time by hands of the operator with respective to the at least one manufacturing unit which is executed by the operator; and
    a display control part that performs control to display objects indicating types and execution times of a plurality of elemental motions on a display part side by side in a time-series order of the time-series data,
    wherein the objects respectively have a same width in a direction in which the objects are lined up in a time-series order and indicate the execution times according to height,
    the display control part performs control to display the objects indicating the types and execution times of the plurality of elemental motions and objects indicating types and execution times of a plurality of elemental motions serving as a reference on the display part side by side in the time-series order.

* * * * *